United States Patent Office 3,000,887
Patented Sept. 19, 1961

3,000,887
PURIFICATION OF PHENOTHIAZINE
Richard Rigby, Ledsham, Wirral, England, assignor to Shell Oil Company, New York, N.Y., a corporation of Delaware
No Drawing. Filed Nov. 10, 1959, Ser. No. 851,961
Claims priority, application Great Britain Mar. 20, 1959
1 Claim. (Cl. 260—243)

This invention relates to the purification of solid materials by distillation.

It is well known that liquids substantially immiscible in water, having an appreciable vapor pressure at 100° C., can be purified by steam distillation, or, as it is commonly called, steam stripping.

It is also possible to use distillation to purify substances which are solids at atmospheric temperatures. It has been found, however, that purification of solid materials by steam distillation has frequently been complicated by the fact that, since it is difficult to avoid some part of the apparatus being at a temperature at which the substance to be purified is in the liquid phase, the substance passes through a sticky phase and so gives rise to difficulties such as pipe blocking.

It is therefore an object of this invention to provide an improved process for the purification of solids. It is a further object to provide an improved process for the purification of solids wherein the purified solid may be formed without intermediate formation of a sticky phase. Other objects will be apparent in the description of the invention.

Now, in accordance with the invention, the aforementioned difficulties are substantially eliminated by distilling the solid substance to be purified in the presence of an inert carrier gas, and allowing the gaseous overhead, comprising the solid substance in the gaseous state and the gaseous carrier, to expand substantially adiabatically into a region where the pressure is such that, as a result of the adiabatic expansion, the temperature falls to a value not higher than the temperature at which all of the substance solidifies.

Although in this specification the words gas and gaseous are used to describe the physical state of a substance it is to be understood that they include the substance when in the vapor state, i.e. when above the boiling point but below the critical point. In fact for most practical purposes it will not be necessary to heat the substance to be purified above the critical point, i.e. it will be present in the vapor state. Similarly, it will often not be necessary to heat the carrier gas, particularly steam, above the critical point. However, the carrier material must be vaporous at least down to the solidification temperature of the solid to be purified and preferably at least 20° C. below the solidification temperature.

Of course, the process of this invention is only applicable to vaporizable normally solid substances which can be distilled without substantial decomposition.

Though the invention can also be used for the purification of a wide range of vaporizable solid substances, it is most advantageously used in the purification of solids which form a sticky phase within a wide temperature range, the lower end of which range adjoins or at least approaches the solidification temperature of the solid substance. Within the context of this specification, "sticky" phase refers to a tacky liquid or semi-solid phase having a viscosity of at least about 25,000 poises. Tackiness, of course, refers to the property of a substance to be drawn into threads when two surfaces of the substance, with a layer of the substance between them, are drawn apart.

The inert carrier gas to be used according to the process of the present invention should be substantially inert chemically to the substance to be purified. Preferably the inert gas is gaseous at the temperature at which the substance to be purified solidifies. Often, however, the most convenient gas to use is steam due to its ready availability, and the ease with which the product is recovered, which may well offset the increased cost arising from the high latent heat of evaporation of water. In other cases nitrogen, for example, may well be a convenient gas to use.

According to the present invention the solid substance is introduced into a vessel which is heated, for example, electrically or by the carrier gas, e.g., steam, and is preferably equipped with stirrer, paddles or other agitators. The vessel is connected to a condensing chamber, for example, a contact condenser wherein the gaseous overheads are condensed.

The substantially adiabatic expansion is preferably carried out by allowing the gaseous overheads to pass from the heating vessel to the condensing chamber through a constriction, for example, a converging-diverging nozzle of the De Laval type which has been designed to attain the necessary pressure and flow rate through the nozzle. With this type of nozzle substantially adiabatic expansion is achieved and rapid cooling of the gas mixture occurs. The term "De Laval nozzle" as used within the context of this specification refers to nozzles characterized by a rounded orifice followed by a divergent diffusing cone.

The constriction or nozzle may be maintained at the temperature of the gaseous overheads before their expansion, i.e. normally the highest temperature of the heating vessel, or it may be maintained at an even higher temperature, without having an adverse effect on the cooling of the solid substance. In this manner, therefore, no part of the apparatus (other than the heating vessel) is at a temperature at which the substance to be purified exists in the liquid state under the prevailing conditions of temperature and pressure.

In order to conserve carrier gas the solid substance may be heated alone in the heating vessel to a temperature, for example above its melting point but below its boiling point, before the introduction of carrier gas into the vessel.

When introduction of the carrier gas has been started the temperature is raised further until there is an acceptable rate of carry-over of gaseous substance to be purified through the constriction into the condensing chamber. As mentioned before, the constriction, for example a De Laval nozzle, is designed to ensure that the difference in pressure between that in the heating vessel and that in the condensing chamber is such that the desired cooling is achieved. In most cases the pressure in the heating vessel will be above atmospheric, for example when purifying phenothiazine about 3 atmospheres, and that in the condensing chamber will be atmospheric. However, in some cases it may be desirable to maintain sub-atmospheric pressures or a vacuum in the condensing chamber. The required pressure in the heating vessel is reached and maintained by ensuring an adequate flow of carrier gas at sufficient pressure.

Although with a correctly designed constriction or nozzle it is not necessary to use a valve between the heating vessel and condensing chamber, in some cases the use of a valve may be desirable. This is particularly true when the condensing chamber is operated under a vacuum or when the pressure differential between the vaporizer and the condensing chamber is required to be high (e.g. greater than, say, 10 atmospheres) in order to obtain the requisite amount of cooling by adiabatic expansion. If a valve is used it may be closed until the necessary temperature and pressure has been reached in the heating vessel. The use of a valve is of particular advantage where it is desirable to conserve the carrier gas;

for without a valve, some gas, consisting mainly of carrier gas, does pass into the condensing chamber before the desired temperature and pressure is reached, i.e. the temperature where an acceptable rate of carry-over of solid substance in the gaseous state is achieved.

When using steam as carrier gas it is often convenient to condense the steam rapidly in the condensing chamber by quenching with water. Provided the solid substance is insoluble or substantially insoluble in water at normal working temperatures, even when using other carrier gases, water may also be injected into the condensing chamber to form a slurry of the solid substance in water. Similarly, for example, if alcohol vapor is used as a carrier gas the expanded gaseous overheads in the condensing chamber can be quenched with alcohol.

When present as a water slurry the purified solid substance is preferably transferred, for example by washing with water, into a settling tank, after which the product is removed and can, for example, be further washed, filtered and dried.

When using other carrier gases, for example, nitrogen, it may be necessary to recover the purified solid substance by the use of, for example, filter bags, electrostatic precipitators, or cyclone separators.

The process of the present invention is conveniently operated as a batch process or it can be operated as a continuous process by adjusting the introduction of the crude impure substance and carrier gas to correspond with the amount of purified substance and carrier gas condensed in the condensing chamber.

For the process of the present invention to be useful economically the solid substances should preferably have a high molecular weight compared with that of the carrier gas. The process of the invention is particularly applicable and advantageous to those substances which would otherwise pass through a sticky phase when passing from the vapor to the solid state.

Compounds which have been found suitable for purification by the process of the present invention, preferably using steam as carrier gas, include organic compounds, for example certain aromatic compounds, such as diphenylamine, parahydroxy diphenyl amine, acridine, anthracene, terphenyl (1:2 and 1:3 diphenyl benzene) naphthalene, 2,2'-bis-(p-hydroxyphenyl propane), and rosin acids, for example abietic acid.

Other suitable compounds, preferably using steam as carrier gas, include disilylbenzene, high molecular weight polynuclear coal tar products, ferrocene (dicyclopentadienyl iron) and solid materials which are normally prepared by the formation of flakes due to rapid cooling of the liquid phase, for example selenium.

The process of the present invention is particularly applicable to the purification of phenothiazine or derivatives thereof, using steam as carrier gas.

Although steam is very often the most suitable carrier gas in some cases other carrier gases should be used. This is particularly desirable where there is a large interval between that temperature at which the solid substance to be distilled has a sufficiently high vapor pressure to distill at an acceptable rate, and that temperature at which the vapor pressure of the solid substance is low enough so that any carry-over of the substance with the carrier gas into the condensing chamber is negligible. In such cases it may well be economic to use carrier gases such as hydrogen and helium which have a comparatively high ratio of the specific heat at constant pressure to that at constant volume, i.e. 1.6 compared with 1.2 for steam. It would then be an advantage to recycle the carrier gas after separation from the solid substance and also it may well be possible to recover some of the kinetic energy in the expanded gas stream as, for example, by means of a turbine wheel.

When purifying some substances better purification may be obtained by distilling in the presence of another compound or element which removes chemically the impurities present in the crude substance. This is illustrated by, and is particularly desirable in, the purification of phenothiazine which often contains up to 0.5% of iodine. When using steam as carrier gas, a small amount of iron powder, for example 1% by weight based on phenothiazine, should therefore be added to the phenothiazine charge to the vessel.

Phenothiazine purified by the process of the present invention is suitable for incorporation as an antioxidant into lubricants, for example, aircraft turbine lubricants.

*Example*

Phenothiazine was purified by the following procedure. A large mild steel vessel, electrically heated, and fitted with stirrer and an electrically heated steam superheater connected to a sparge ring in the bottom of the vessel was used. This was connected to a contact condenser by means of a converging-diverging nozzle outlet of the De Laval type.

14 parts by weight of impure phenothiazine and 0.28 part by weight of iron powder were introduced into the vessel through a charging flange and the vessel was closed and heating started. When the temperature of the charge reached 280° C., after about one hour, the steam-superheater was operated and steam at 300° C. was passed through the charge. The steam was controlled to maintain a pressure of about 45 p.s.i.g. in the vessel.

The distillate and steam were then cooled adiabatically by expanding through the converging-diverging nozzle to the contact condenser maintained at atmospheric pressure. The steam was condensed in the contact condenser and the solid purified phenothiazine so formed was washed into a mild steel baffled tank. It was found that the phenothiazine was being distilled at about 7 parts by weight per hour, and that the phenothiazine did not pass through a sticky phase.

The product was removed from the settling tank at intervals by hand and slurried with methanol. The slurry was filtered, washed on the filter with a portion of methanol and dried at 40° to 50° C.

Analysis by X-ray spectrometry of samples of the product taken at ¼ hour intervals during the distillation indicated that the iodine content had decreased from about 0.37% in the impure compound to less than 0.03% in the purified compound.

The phenothiazine purified by this procedure was found suitable for incorporation as antioxidant into aircraft turbine lubricants.

I claim as my invention:

Process for the purification of phenothiazine which comprises steam distilling said phenothiazine at a pressure of at least about 3 atmospheres with superheated steam and at a temperature of at least about 280° C. to form a gaseous overhead stream comprising phenothiazine and steam, and expanding the gaseous overhead stream substantially adiabatically to substantially atmospheric pressure and a temperature at which all of the phenothiazine solidifies.

References Cited in the file of this patent
UNITED STATES PATENTS

| | | |
|---|---|---|
| 2,415,363 | Mitchell et al. | June 22, 1944 |
| 2,829,155 | Muench et al. | Apr. 1, 1958 |